(12) United States Patent
Tripathi et al.

(10) Patent No.: US 7,028,091 B1
(45) Date of Patent: Apr. 11, 2006

(54) WEB SERVER IN-KERNEL INTERFACE TO DATA TRANSPORT SYSTEM AND CACHE MANAGER

(75) Inventors: Sunay Tripathi, Santa Clara, CA (US); Bruce W. Curtis, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 665 days.

(21) Appl. No.: 09/654,103

(22) Filed: Aug. 31, 2000

(51) Int. Cl.
*G06F 15/16* (2006.01)

(52) U.S. Cl. ................ 709/230; 709/217; 709/235

(58) Field of Classification Search ........... 709/101, 709/104, 226, 229, 225, 217, 235, 227, 230
See application file for complete search history.

(56) References Cited

U.S. PATENT DOCUMENTS

| | | | |
|---|---|---|---|
| 5,630,166 A | 5/1997 | Gamache et al. ............ 712/9 |
| 5,659,757 A | 8/1997 | Browning et al. | |
| 5,805,809 A | 9/1998 | Singh et al. | |
| 5,819,091 A | 10/1998 | Arendt et al. | |
| 5,832,222 A | 11/1998 | Dziadosz et al. | |
| 5,835,724 A | 11/1998 | Smith | |
| 5,852,717 A | 12/1998 | Bhide et al. | |
| 5,951,694 A * | 9/1999 | Choquier et al. ............ 714/15 |
| 5,968,127 A * | 10/1999 | Kawabe et al. ............ 709/226 |
| 5,991,802 A | 11/1999 | Allard et al. | |
| 6,012,090 A | 1/2000 | Chung et al. | |
| 6,073,212 A | 6/2000 | Hayes et al. | |
| 6,115,712 A | 9/2000 | Islam et al. | |
| 6,131,122 A * | 10/2000 | Sampson ................. 709/227 |
| 6,138,162 A * | 10/2000 | Pistriotto et al. ........... 709/229 |
| 6,163,812 A | 12/2000 | Gopal et al. | |
| 6,170,018 B1 | 1/2001 | Voll et al. ................. 709/304 |
| 6,192,398 B1 | 2/2001 | Hunt | |
| 6,216,173 B1 | 4/2001 | Jones et al. | |
| 6,223,204 B1 | 4/2001 | Tucker | |
| 6,260,120 B1 | 7/2001 | Blumenau .................. 711/152 |
| 6,292,835 B1 | 9/2001 | Huang et al. | |
| 6,321,181 B1 * | 11/2001 | Havens ..................... 703/13 |
| 6,334,142 B1 * | 12/2001 | Newton et al. ............ 709/206 |
| 6,374,305 B1 * | 4/2002 | Gupta et al. .............. 709/246 |
| 6,377,984 B1 * | 4/2002 | Najork et al. ............. 709/217 |
| 6,389,462 B1 * | 5/2002 | Cohen et al. ............. 709/218 |
| 6,411,998 B1 | 6/2002 | Bryant et al. | |

(Continued)

OTHER PUBLICATIONS

Ahmed Helmy, *Protocol Independent Multicast-Sparse Mode (PIM-SM): Inmplementation Document*, University of Southern California, PIM-SM-implementation.ps, Jan. 19, 1997.

(Continued)

*Primary Examiner*—Ario Etienne
*Assistant Examiner*—Avi Gold
(74) *Attorney, Agent, or Firm*—Beyer Weaver & Thomas LLP (57) ABSTRACT

A HTTP request is sent to a web server. A HTTP request including HTTP request data is received. A connection identifier is associated with the HTTP request. The receiving and associating steps are repeated for one or more HTTP requests. The connection identifier and the associated HTTP request data for the one or more HTTP requests are then sent in a single stream to the web server (e.g., HTTP process). When a HTTP request including HTTP request data are processed by a web server, the HTTP request data and an associated connection identifier are received. HTTP response data associated with the HTTP request data is obtained. The HTTP response data and the connection identifier are then sent.

20 Claims, 9 Drawing Sheets

U.S. PATENT DOCUMENTS 6,418,544 B1 * 7/2002 Nesbitt et al. ............... 714/43
6,421,675 B1    7/2002 Ryan et al.
6,611,873 B1 * 8/2003 Kanehara .................... 709/238

OTHER PUBLICATIONS

Robbert Van Renesse, et al., *Horus: A Flexible Group Communications System*, Dept. of Computer Science, Cornell University, http://www.cs.cornell.edu/Info/Projects/HORUS.

Bruce W. Curtis, "User Level Web Server Cache Control of In-Kernel HTTP Cache," U.S. Appl. No. 09/513,328, filed Feb. 25, 2000, 44 Pages.

Bruce W. Curtis, "User Level Web Server In-Kernel Network I/O Accelerator," filed Feb. 25, 2000, 46 Pages.

David C. Steere, et al., *Efficient User-Level File Cache Management on the Sun Vnode Interface*, School of Computer Science, Carnegie Mellon University, CMU-CS-90-126, Apr. 18, 1990.

Pei Cao, et al., *Implementation and Performance of Integrated Application-Controlled File Caching, Prefetching, and Disk Schedulting*, ACM Transactions on Computer Systems, vol. 14, No. 4, Nov. 1996, pp. 311-343.

Sambavi Muthukrishnan, et al., *Webfs: a File System Interface to the World Wide Web*, Computer Sciences Department, University of Wisconsin—Madison, Dec. 13, 1999.

Peter J. Brannm, et al., *Porting the Coda File System to Windows*, USENIX, Monterey, California, Jun. 6-11, 1999.

Oleg Kiselyov, *A Network file System over HTTP: Remote Access and Modification of Files and files*, USENIX, Monterey, California Jun. 6-11, 1999.

"Solaris Network Cache and Accelerator" Hejazi Homepage, Online, May 2000, XP002274654 Retrieved from the Internet: URL:http://www.hejazi.org/solaris/snca/snca-wp.pdf> retrieved on Mar. 22, 2004.

Duane Wessels, Squid Developers: "Squid Programmers Guide" Squid Cache Homepage, Online, Jan. 17, 2000, XP002274655 Retrieved from the Internet: URL:http://web.archive.org/web/20001001011744/www.squid-cache.org/Doc/Prog-Guide/prog-guide-2.html> retrieved on Mar. 22, 2004.

Richard W. Stevens, "UNIX Network Programming," 1999, Prentice Hall Ptr, Upper Saddle River, NJ 07458, USA, XP002274657.

"System Administration Guide," Livingston Observatory Homepage, Online, Feb. 2000, XP002274656 Retrieved from the Internet: URL:http://www.ligo-la.caltech.edu/{support/806-0916.pdf> retrieved on 20004-03-22.

* cited by examiner

WEB SERVER IN-KERNEL INTERFACE TO DATA TRANSPORT SYSTEM AND CACHE MANAGER

CROSS REFERENCE TO RELATED APPLICATIONS

This invention is related to U.S. Pat. No. 6,668,279, filed on Feb. 25, 2000, naming Bruce W. Curtis as inventor, and entitled "USER LEVEL WEB SERVER IN-KERNEL NETWORK I/O ACCELERATOR." That application is incorporated herein by reference in its entirety and for all purposes.

This invention is related to U.S. patent application Ser. No. 09/513,328, filed on Feb. 25, 2000, naming Bruce W. Curtis as inventor, and entitled "USER LEVEL WEB SERVER CACHE CONTROL OF IN-KERNEL HTTP CACHE." That application is incorporated herein by reference in its entirety and for all purposes.

BACKGROUND OF THE INVENTION

1. Field of the Invention

The present invention relates generally to computer software. More particularly, the present invention relates to methods and apparatus for providing an in-kernel interface to a web server.

2. Description of Related Art

Figure 1:
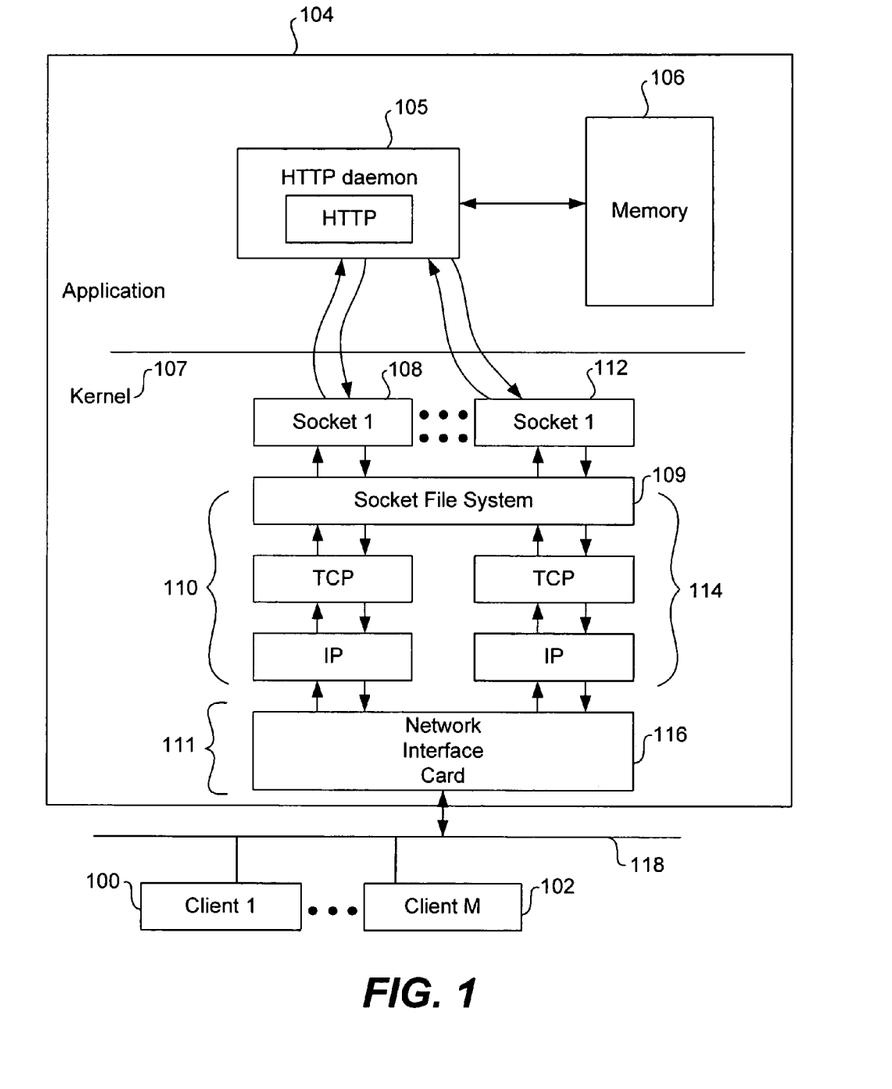
FIG. 1 is a block diagram illustrating a conventional web server.

FIG. 1 is a block diagram illustrating a conventional web server 104. Through the use of a web browser and the web server 104, a user may access a web page stored on the web server 104 through the Internet. In this manner, multiple Hypertext Transfer Protocol (HTTP) clients (e.g., web browsers) 100, 102 may access files via the single web server 104. Typically, a browser user enters HTTP file requests by either "opening" a Web file (e.g., typing in a Uniform Resource Locator or URL) or clicking on a hypertext link. The browser builds a HTTP request and sends it to the Internet Protocol (IP) address indicated by the URL. When the web browser 100 or 102 sends a HTTP request to the web server 104 identified by the IP address, the web server 104 receives the request and, after any necessary processing, the requested file (i.e., HTTP response data) is returned.

Within the web server 104, HTTP requests that are received are processed by a HTTP daemon 105. The HTTP daemon 105 is a program that runs continuously on the web server 104 and exists for the purpose of handling HTTP requests. The HTTP daemon 105 forwards the received HTTP requests to other programs or processes as appropriate. Thus, each web server has a HTTP daemon 105 that continually waits for requests to come in from Web clients and their users. Once a file (i.e., HTTP response data) is obtained (e.g., from an associated web server cache memory 106), the data is transmitted by the daemon 105 to the client 100 or 102 that requested the data. In addition, the web server cache 106 is often used to store HTTP response data. As an alternative to cache memory, the HTTP daemon 105 may have other storage media associated with it. Such media, for example, can include a hard drive.

HTTP requests are typically initially handled by a kernel 107 that is responsible for forwarding the requests from the client 100 or 102 to the HTTP daemon 105. The kernel 107 is the essential central part of a computer operating system, the core that provides basic services for all other parts of the operating system. Typically, a kernel includes an interrupt handler that handles all requests or completed I/O operations that compete for the kernel's services, a scheduler that determines which programs share the kernel's processing time in what order, and a supervisor that actually gives use of the computer to each process when it is scheduled. The kernel 107 may also include a manager of the operating system's memory address spaces, sharing these among all components and other users of the kernel's services. A kernel's services are requested by other parts of the operating system or by applications through a specified set of program interfaces sometimes known as system calls. The kernel 107 also provides services such as buffer management, message routing, and standardized interfaces to protocols which enable data to be routed between clients 100, 102 and a server 104.

As it applies to handling server/client communications, the kernel structure consists of three layers: a socket layer 108, a protocol layer 110, and a device layer 111. The socket layer 108 supplies the interface between the HTTP daemon 105 and lower (protocol and device) layers, the protocol layer 110 contains protocol modules for communication, and the device layer 111 contains device drivers that control network devices. Thus, a server and client process may communicate with one another through the socket layer 108. More particularly, a socket file system 109 (SOCKFS) is associated with the socket layer 108 and is adapted for managing the socket layer 108.

Conventional Unix network input/output is provided through the use of a file descriptor opened on a socket. A "socket" is a method for communication between a client program and a server program in a network. A socket is defined as "the endpoint in a connection." Sockets are created and used with a set of programming requests or "function calls" sometimes called the sockets application programming interface (API). A file descriptor is typically an integer that identifies an open file within a process which is obtained as a result of opening the file. In other words, a separate socket is required for each network connection. Thus, as shown, each network connection corresponding to a client request has an associated socket layer 112 and protocol layer 114, which may send data via a network interface card 116 via a transmission medium 118 to one or more clients 100, 102. Each socket has its own socket data structure. Since a separate file descriptor is opened on a socket for each network connection, in-kernel resources are unnecessarily consumed. Moreover, there are limits to the number of file descriptors that may be opened at a particular instant in time.

STREAMS is a general, flexible programming model for Unix system communication services. STREAMS defines standard interfaces for character input/output (I/O) within the kernel, and between the kernel and the rest of the UNIX system. The mechanism consists of a set of system calls, kernel resources, and kernel routines. STREAMS enables the creation of modules to provide standard data communications services. A STREAMS module is a defined set of kernel-level routines and data structures. From the application level, modules can be dynamically selected and interconnected. No kernel programming, compiling, and link editing are required to create the interconnection. STREAMS provides an effective environment for kernel services and drivers requiring modularity. STREAMS parallels the layering model found in networking protocols.

A stream is a data path that passes data in both directions between a STREAMS driver in kernel-space and a process in user space. An application creates a stream by opening a STREAMS device. When a STREAMS device is first opened, the stream consists of only a stream head and a STREAMS driver. A STREAMS driver is a device driver that implements the STREAMS interface. A STREAMS device driver exists below the stream head and any modules. It can act on an external I/O device, or it can be an internal software driver, called a pseudo-device driver. A stream-head is the end of the stream nearest the user process. It is the interface between the stream and the user process. The STREAMS device driver transfers data between the kernel and the device. STREAMS enables the manipulation of the modules on a stream.

In order for the TCP protocol layer to communicate with the HTTP daemon, a new stream is typically created for each connection. Since a stream is associated with a single connection, the stream does not include identifying information that identifies the connection. On the contrary, since a separate stream is opened for each connection, such identifying information is stored in association with the connection (e.g., by the TCP protocol layer and by the SOCKFS). This private state which uniquely identifies the connection includes information such as a remote IP address, a remote port, a local IP address, and a local port. It is important to note that since such identifying information is not included in the stream, data for only a single connection may be sent in the stream. As a result, multiple streams must be created in order to transmit HTTP request data from a client to the HTTP daemon. Since it is difficult to pre-create such streams, this stream creation is preferably performed dynamically. However, numerous steps must be performed before data can be sent in a data stream.

Figure 2:
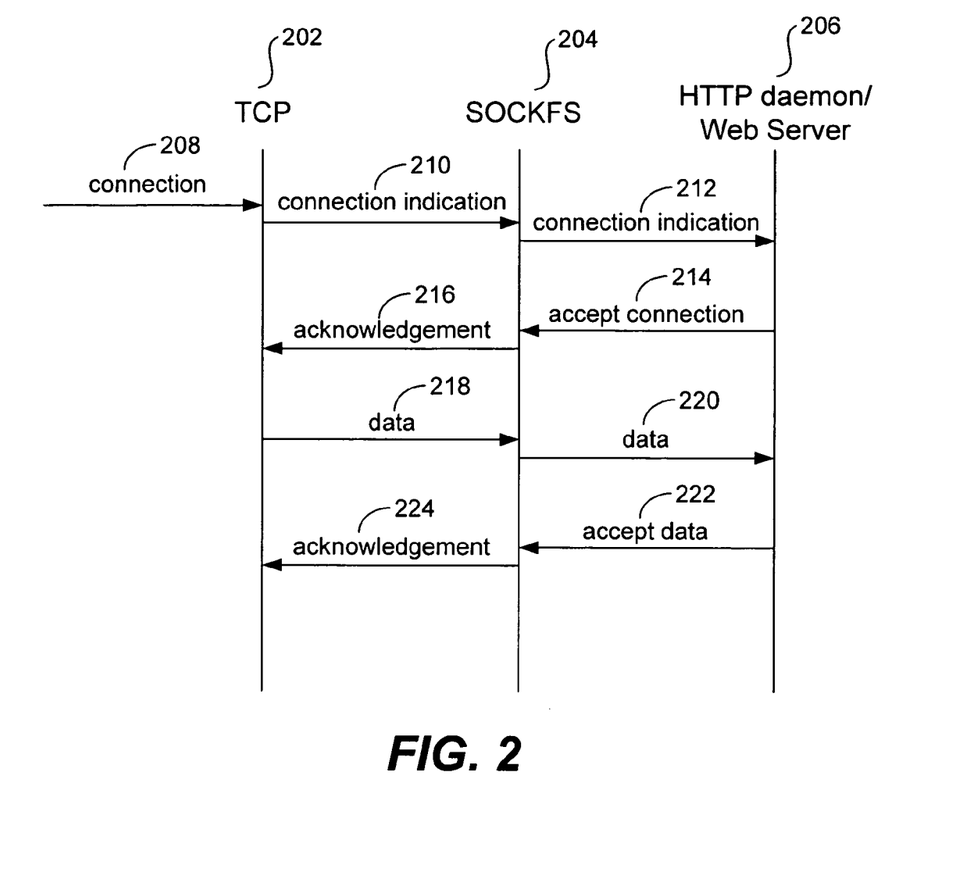
FIG. 2 is a process flow diagram illustrating conventional stream creation and management of HTTP request data.

FIG. 2 is an exemplary diagram illustrating data flow associated with a HTTP request. TCP protocol layer is represented by line 202, socket file system (SOCKFS) is represented by line 204, and HTTP daemon is represented by line 206. As shown, for each connection 208, the TCP protocol layer 202 sends a connection indication 210 to the socket file system 204. The SOCKFS 204 then sends a connection indication 212 to the HTTP daemon 206. The HTTP daemon 206 accepts the connection by sending a message as shown at 214 to the SOCKFS 204. The SOCKFS then sends an acknowledgement 216 to the TCP protocol layer 202. Once the acknowledgement 216 has been received by the TCP protocol layer 202, data 218 is sent to the SOCKFS 204. The data is then transmitted as shown at 220 to the HTTP daemon 206. The HTTP daemon 206 then accepts the data as shown at 222. The SOCKFS 204 then sends an acknowledgement 224 to the TCP protocol layer 202. As shown and described with reference to FIG. 2, multiple steps must typically be performed in order to transmit HTTP request data to a web server. Accordingly, it would be beneficial if the time required to send HTTP request data to a web server could be reduced while minimizing memory and processing resources. Similarly, it would be desirable if HTTP response data could be sent in a compatible and efficient manner from the web server to the requesting client. In addition, it would be preferable if such a system could be implemented without requiring modifications to the HTTP daemon.

SUMMARY

The present invention enables HTTP requests to be transmitted to a web server while minimizing memory and processing resources. Similarly, HTTP response data is sent in a compatible and efficient manner from the web server to the requesting client.

In accordance with one aspect of the invention, a HTTP request is sent to a web server. A HTTP request including HTTP request data is received. A connection identifier is associated with the HTTP request. The receiving and associating steps are repeated for one or more HTTP requests. The connection identifier and the associated HTTP request data for the one or more HTTP requests are then sent in a single stream to the web server (e.g., HTTP process).

In accordance with another aspect of the invention, a HTTP response including HTTP response data received from a web server is processed. HTTP response data and an associated connection identifier are received from a HTTP process. A stream is created. The HTTP response data and the associated connection identifier are then sent in the stream.

In accordance with another aspect of the invention, a HTTP request including HTTP request data are processed by a web server. HTTP request data and an associated connection identifier are received. HTTP response data associated with the HTTP request data is obtained. The HTTP response data and the connection identifier are then sent.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order not to unnecessarily obscure the present invention.

In the following described embodiment, HTTP request and response data are transferred between a HTTP daemon (i.e., web server) and a network cache accelerator. Moreover, the present invention may be implemented using any appropriate mechanism (e.g., Remote Procedure Call mechanism) for communicating between an application and an in-kernel module. For instance, the present invention may be applicable in a Unix system and makes use of the Unix notion of the filesystem as a universal name space. In addition, the present invention may implement a Remote Procedure Call (RPC) mechanism which has built in support for multi-threading. The present invention may be implemented on any system which includes an application and a kernel. For instance, the invention may be applicable to a system having a kernel and an application transport protocol layer (e.g., FTP) which is data intensive.

Figure 3:
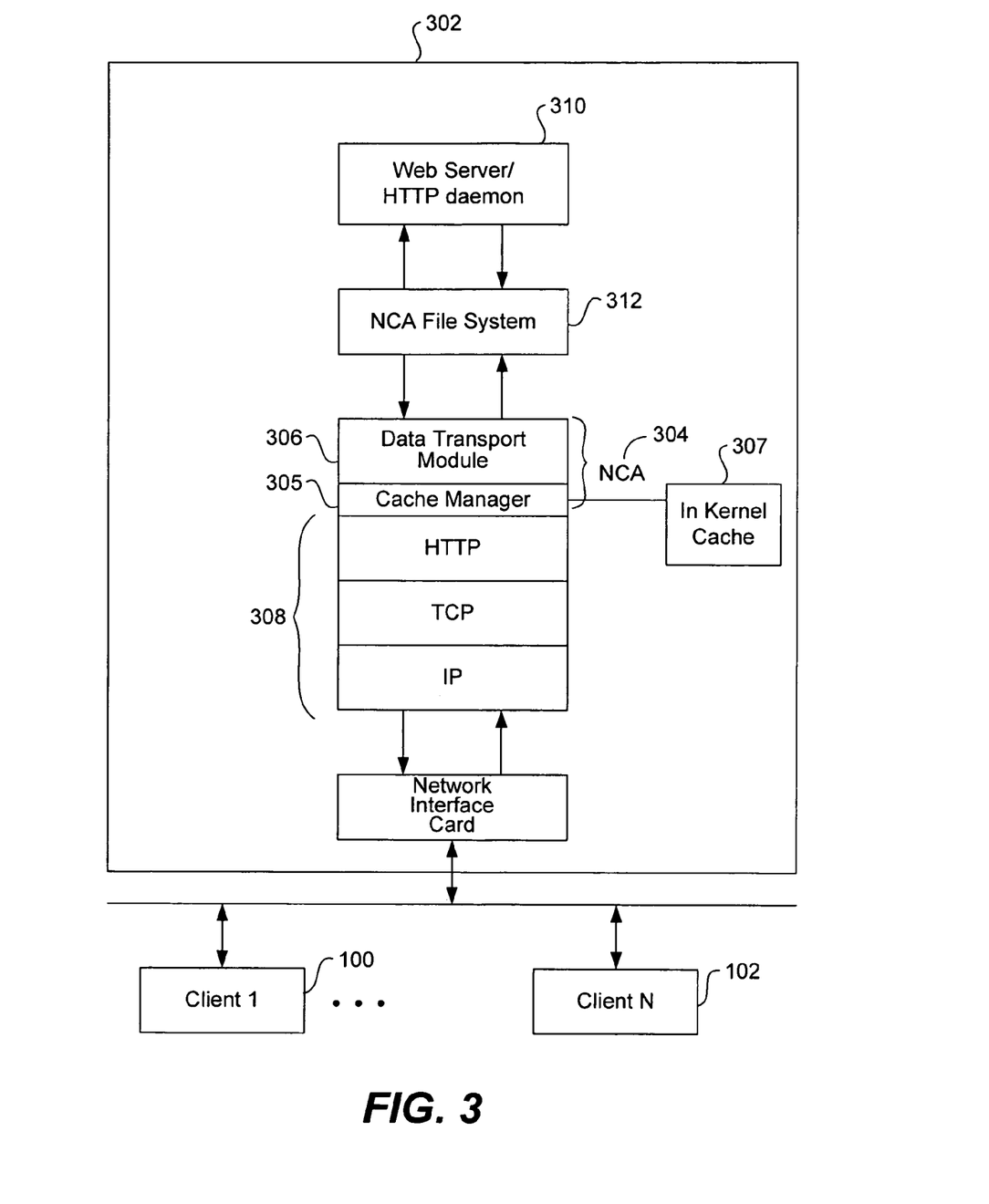
FIG. 3 is a block diagram illustrating a system in which a network cache accelerator and associated file system are implemented in accordance with an embodiment of the invention.

FIG. 3 is a block diagram illustrating a system in which a network cache accelerator and associated file system are implemented in accordance with an embodiment of the invention. As shown in FIG. 3, multiple clients 100, 102 may send HTTP requests to a web server 302. Within the web server 302, a network cache accelerator (NCA) 304 includes a cache manager 305 and a data transport module 306. An in-kernel cache 307 is managed by the cache manager 305 which has an associated protocol stack 308. The data transport module 306 routes HTTP requests or portions thereof (and/or other information or requests) to a HTTP daemon 310 via a NCA file system 312. More particularly, the data transport module 306 places an object (e.g., containing the HTTP request data, connection identifier and/or other requests or information) for one or more HTTP requests in a single listening stream. As described above, the prior art method sent a connection indication to SOCKFS, which would forward it to the web server. The web server would then accept the connection and a new stream would then be created between the SOCKFS and the web server. Once the stream was created, the data could be sent to the web server via the SOCKFS.

The NCA file system 312 preferably stores the HTTP request data and associated connection identifier for the HTTP requests. The HTTP daemon 310 obtains the HTTP request data from the NCA file system 312. The connection identifier is preferably maintained as private information between the NCA and the NCAFS to enable the present invention to be used with any web server. In other words, the web server need not be modified to accommodate the present invention.

Next, a method implemented by the HTTP daemon 310 is invoked and the HTTP daemon 310 returns a HTTP response (or portion thereof) and/or directives to control information that is stored in the in-kernel cache 307 or control the transmission of information to a client 100 or 102. This information is sent to the NCA 304. More particularly, the HTTP daemon 210 provides an object containing the HTTP response and/or directives to the NCA file system 312. The NCA file system 312 obtains the object, provides the connection identifier in the object, creates a new stream, and sends this object to the NCA 304 via the newly created stream. It is important to note that the new stream may be created while the web server 302 is processing the request. The NCA 304 may then obtain the HTTP response and/or directives from the object so that it may determine how to manage the transmission and/or storage of response data received from the HTTP daemon 310. In this manner, the HTTP daemon 310 may manage information that is stored, modified and/or purged from the in-kernel cache 307 as well as control information that is transmitted to the clients 100 and 102.

Figure 4:
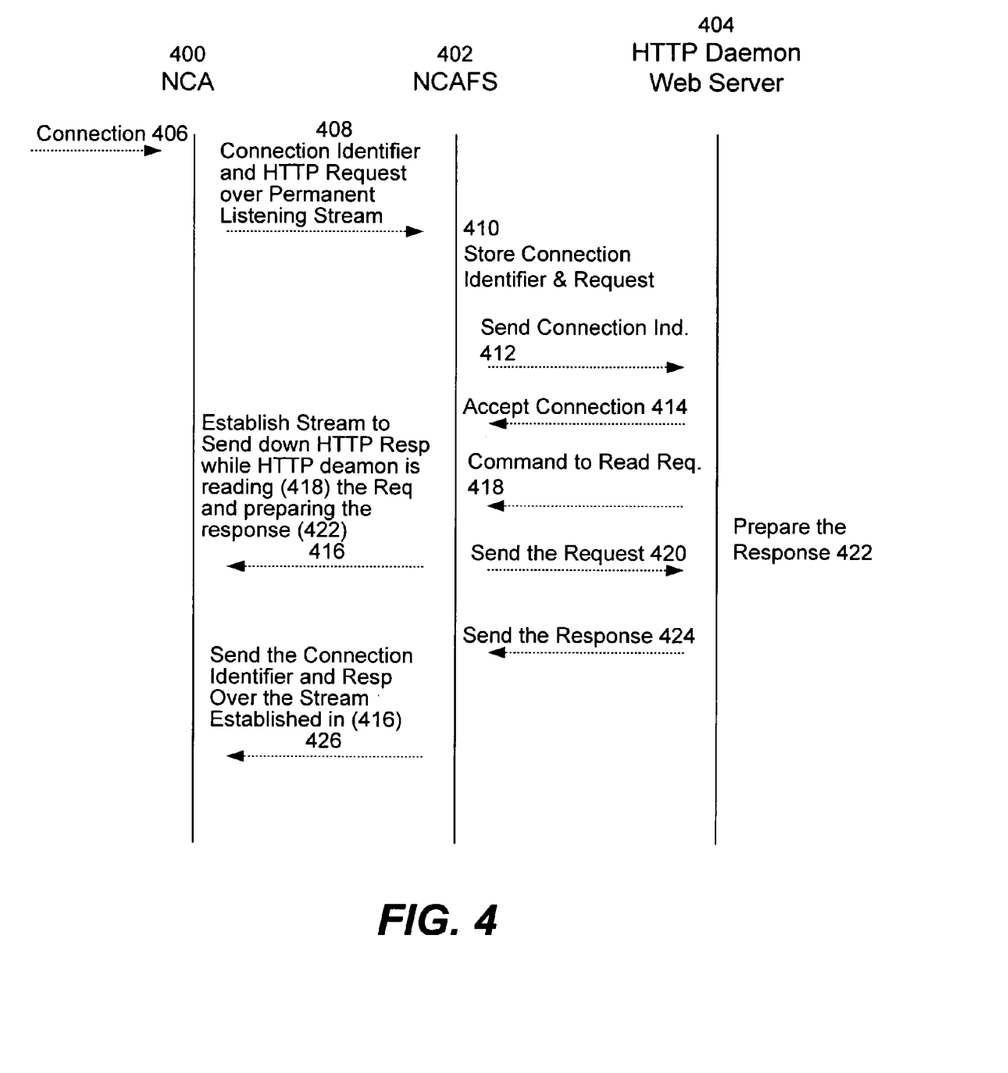
FIG. 4 is a process flow diagram illustrating stream creation and management of HTTP request data in accordance with an embodiment of the invention.

FIG. 4 is a process flow diagram illustrating stream creation and management of HTTP request data in accordance with an embodiment of the invention. As shown, the NCA is represented by vertical line 400, the NCA file system is represented by vertical line 402 and the HTTP daemon is represented by vertical line 404. When a connection 406 (i.e., HTTP request) is received by the web server, the NCA 400 sends a connection identifier and HTTP data for the HTTP request as shown at 408. More particularly, the NCA 400 sends a connection identifier and associated HTTP data for one or more HTTP requests in a single stream. This is possible since the amount of data that must be sent for a HTTP request is relatively minimal in comparison to a HTTP response. In other words, a new stream need not be created for each new HTTP request received. The NCA file system 402 stores the connection identifier and HTTP request data for the HTTP requests as shown at 410. For each HTTP request, the NCA file system 402 sends a connection indication 412 to the HTTP daemon 404. The HTTP daemon sends an accept command 414 followed by a read request as shown at 418 to the NCA file system 402. Since the NCA file system 402 has already obtained the HTTP request data for the HTTP request, the NCA file system responds by sending the associated HTTP request data at 420 to the HTTP daemon 404.

The HTTP daemon 404 then prepares the response 422. As shown at 416, the NCAFS establishes a stream to send the HTTP response prepared at 422. More particularly, the stream may be established in parallel with steps 418 and 422. Once the response is prepared at 422, the response is sent to the NCAFS at 424. At 426 the NCAFS 402 then sends the response and associated connection identifier over the stream established at 416.

In accordance with one embodiment, the connection identifier is sent to the HTTP daemon with the HTTP request as well as from the HTTP daemon with the HTTP response. More particularly, when the HTTP daemon 404 accepts the connection as shown at 414, a new file descriptor is returned to it. It then "reads" the HTTP request on this new file descriptor. In accordance with the present invention, a segment of private information is attached to this new file descriptor. More particularly, the private information includes a connection identifier associated with the HTTP request. The private information is intended to be shared by the NCA and the NCAFS to identify the HTTP request and therefore need not be obtained or examined by the web server. When the HTTP daemon sends the HTTP response to the NCAFS at 424, this "write" is performed on this same file descriptor on which the "read" was performed. In this manner, the NCAFS may obtain the connection identifier related to that connection from the private information such that the HTTP response may be associated with the previously sent HTTP request.

Figure 5:
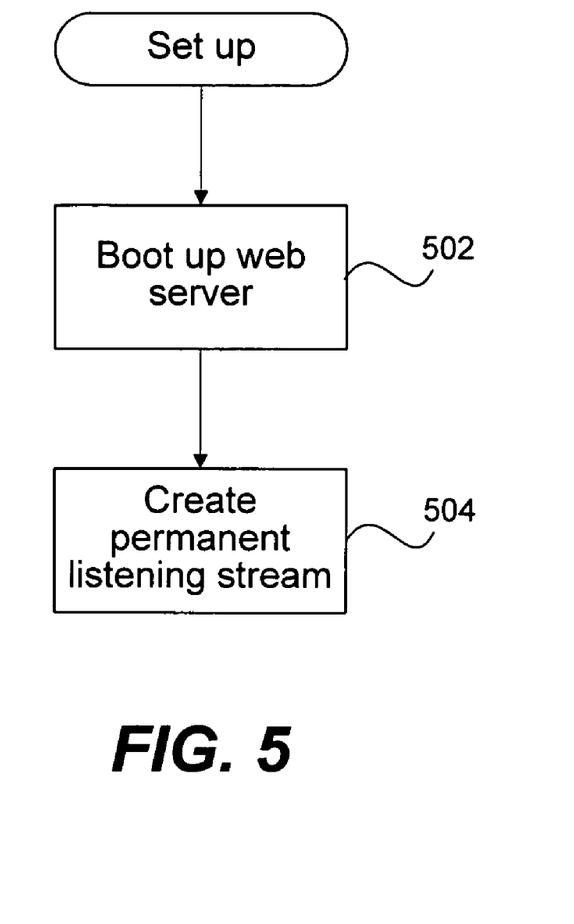
FIG. 5 is a process flow diagram illustrating a method of configuring a web server in accordance with an embodiment of the invention.

FIG. 5 is a process flow diagram illustrating a method of configuring a web server in accordance with an embodiment of the invention. As shown, the web server is booted up at block 502. A permanent listening stream is then created at block 504. Once the permanent listening stream is created, the connection identifier and associated HTTP request data for one or more HTTP requests may be sent in the permanent listening stream to the web server or HTTP process such as a HTTP daemon. In this manner, HTTP request data for multiple HTTP requests may be sent simultaneously for access by a web server. When the web server is shut down, the listening stream may then be removed.

Once the web server is set up, HTTP requests may be sent to the web server. Similarly, once the HTTP requests are processed by the web server, HTTP responses may be sent to the requesting clients. Processing of HTTP requests and responses will be described in further detail below with reference to FIG. 6 and FIG. 7, respectively.

Figure 6:
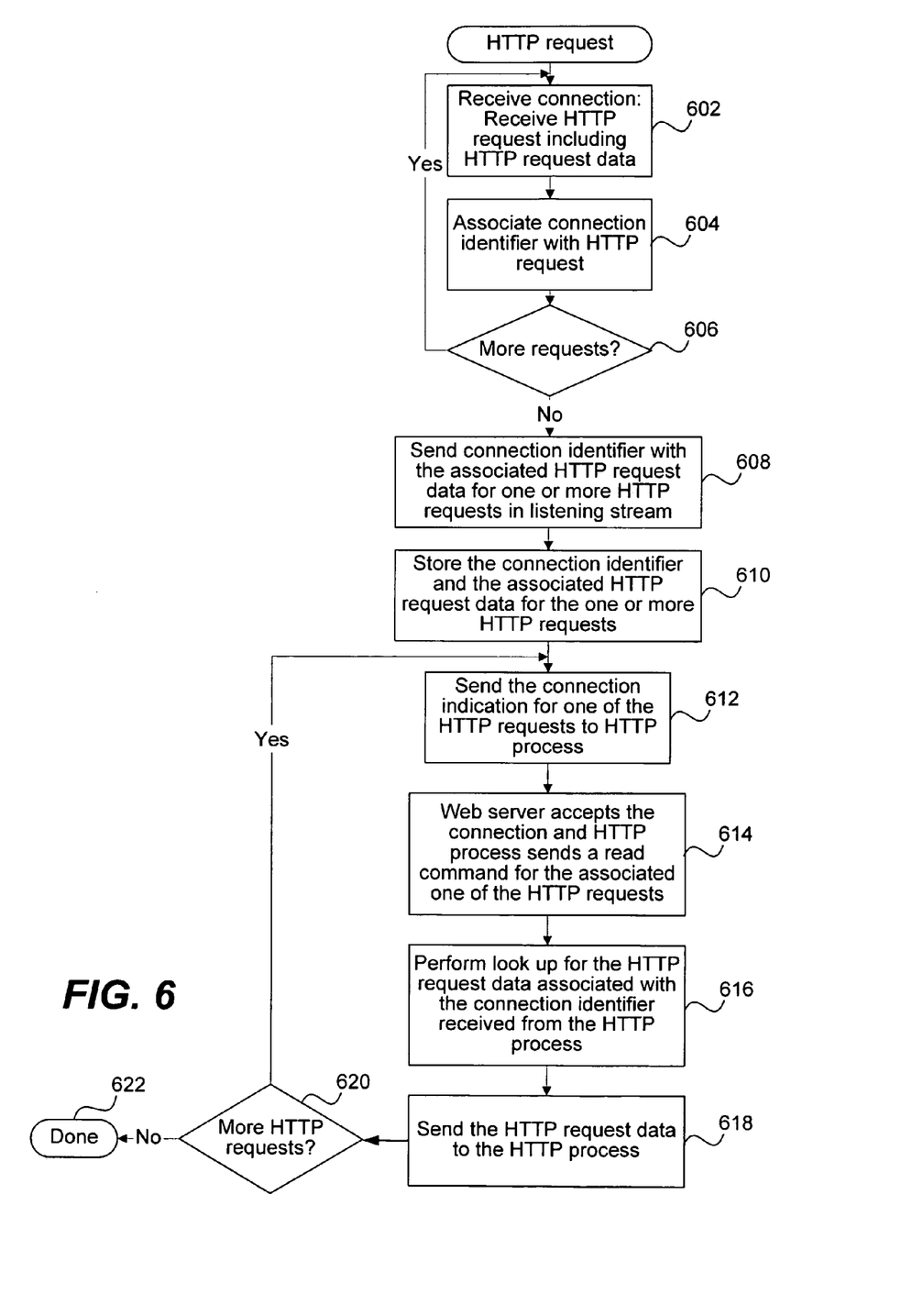
FIG. 6 is a process flow diagram illustrating a method of processing a HTTP request in accordance with an embodiment of the invention.

FIG. 6 is a process flow diagram illustrating a method of processing a HTTP request in accordance with an embodiment of the invention. When a connection is received by the web server, a HTTP request including HTTP request data is received at block 602. A connection identifier is then associated with the HTTP request at block 604. If it is determined that there are more HTTP requests at block 606, steps 602 and 604 are repeated for one or more HTTP requests. Thus, the NCA continually sends HTTP requests as and when they arrive. In other words, the NCA need not wait for more HTTP requests to be received. At block 608, the connection identifier and the associated HTTP request data for the one or more HTTP requests are sent (e.g., by the NCA) in a single stream such as the permanent listening stream described above with reference to FIG. 5. For instance, the connection identifier and the associated HTTP request data may be provided to a cache manager capable of storing the connection identifier and the associated HTTP request data and retrieving the HTTP request data when the connection identifier is received. The connection identifier and the associated HTTP request data for the one or more HTTP requests may be provided in an object which is then sent to a HTTP process. Alternatively, the connection identifier and the associated HTTP request data for each of the one or more HTTP requests may then be stored temporarily (e.g., by the NCA file system) at block 610 for retrieval by the HTTP process (i.e., HTTP daemon). The cache manager may therefore store the HTTP request and response data so that the same request may be handled by the NCA file system in the future. In order to notify the HTTP process that a connection has been received and that HTTP data has been stored for retrieval by the HTTP process, the connection indication for one of the HTTP requests is sent to the HTTP process at block 612.

When the HTTP process receives the connection indication for a HTTP request, the HTTP process accepts the connection and sends a read command at block 614. In response, the HTTP request data associated with the connection identifier received from the HTTP process is obtained at block 616. The obtained HTTP request data and the associated connection identifier is then sent to the HTTP process at block 618. If it is determined at block 620 that there are more HTTP requests, the process repeats at block 612. Otherwise, the process ends at block 622.

Figure 7:
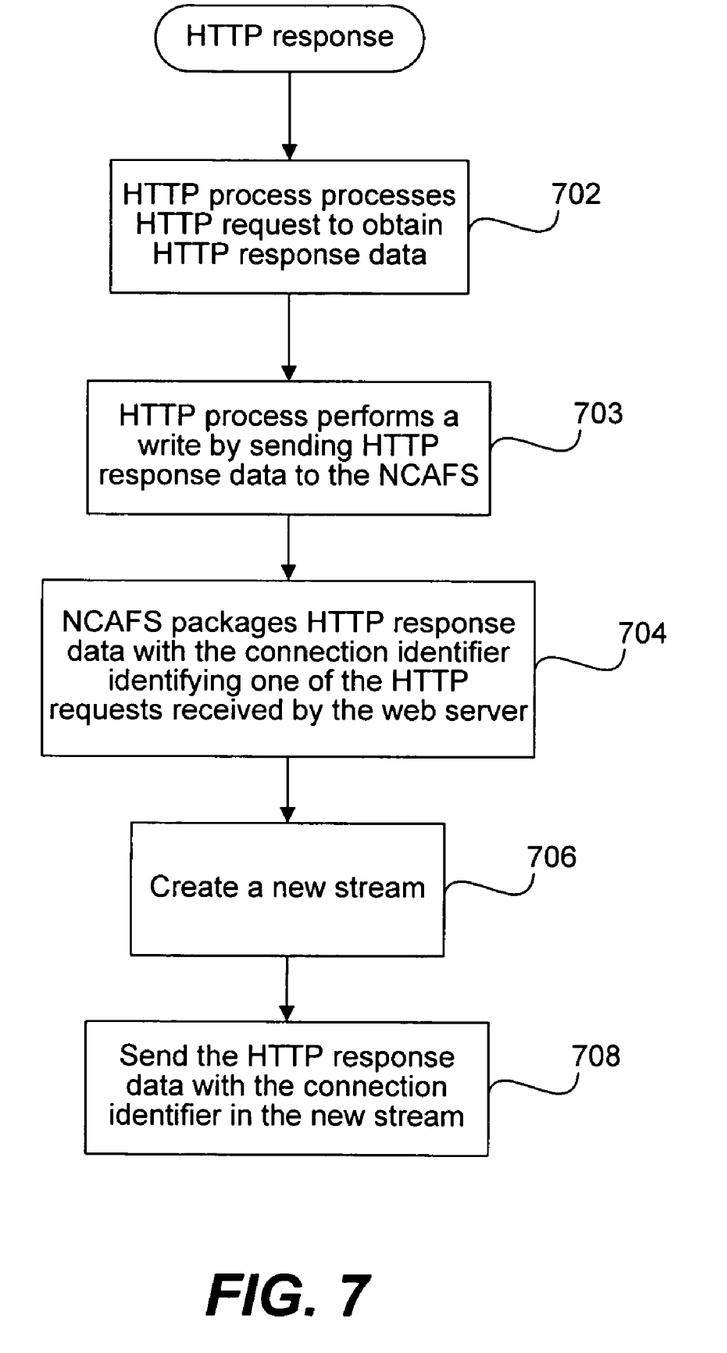
FIG. 7 is a process flow diagram illustrating a method of processing a HTTP response in accordance with an embodiment of the invention.

FIG. 7 is a process flow diagram illustrating a method of processing a HTTP response in accordance with an embodiment of the invention. The web server (i.e., HTTP process) processes the HTTP request to obtain HTTP response data associated with the HTTP request data at block 702. The HTTP process then performs a write by sending HTTP response data to the NCAFS at 703. The NCAFS then packages the HTTP response data with the connection identifier identifying one of the HTTP requests received by the web server at block 704. When the HTTP response data has been obtained from the HTTP process, a new stream is created at block 706. For instance, the new stream may be created by the NCA file system. The HTTP response data and the associated connection identifier are then sent in the newly created stream at block 708. For instance, an object may be instantiated in which the HTTP response data and the connection identifier are provided. The NCA (e.g., data transport module) may then intercept and transmit the HTTP response data to the client.

Figure 8:
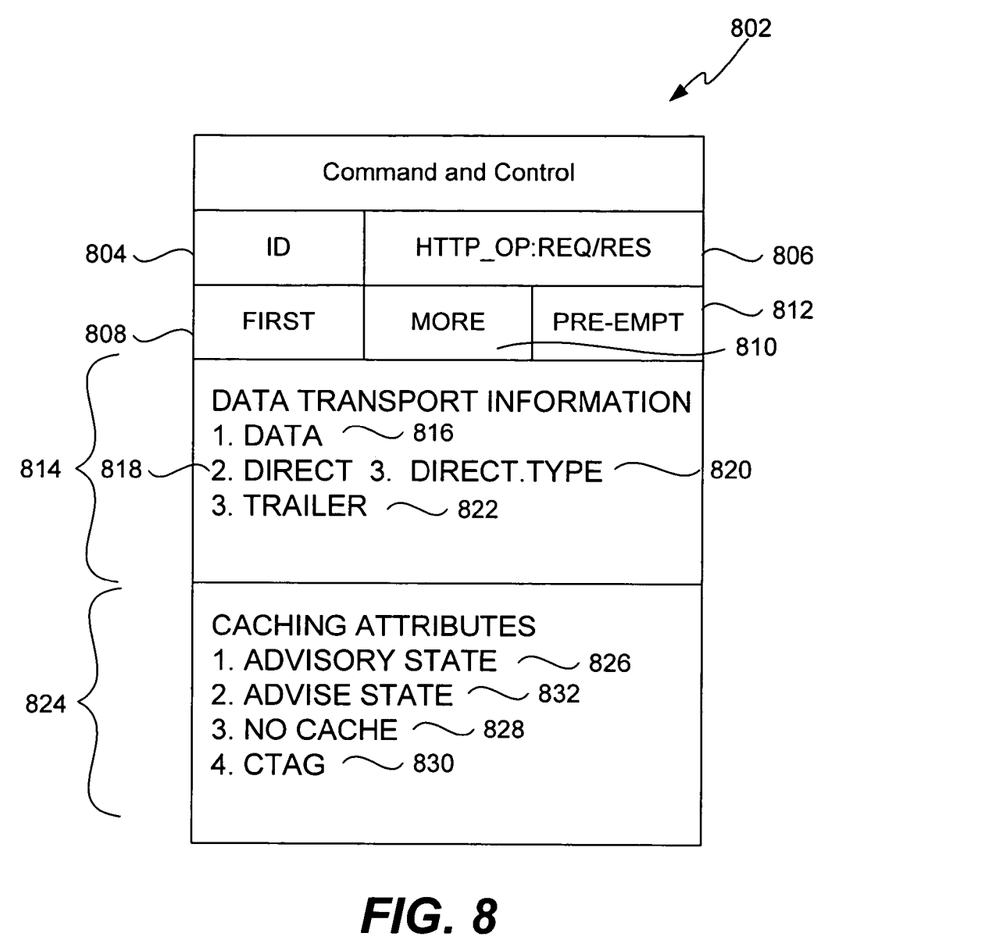
FIG. 8 is a block diagram illustrating an exemplary object that may be used to transport HTTP request and response data in accordance with an embodiment of the invention.

As described above, the NCA 304 and the HTTP daemon 310 communicate through sending an object. FIG. 8 is a block diagram illustrating an exemplary data type that may be transported in accordance with an embodiment of the invention. More particularly, in accordance with one embodiment, the data transport module 306 and the HTTP daemon 310 both transmit a HTTP request-response object. The information that may be provided in the HTTP request-response object is illustrated generally in FIG. 8. A HTTP request-response object 802 is shown to identify the data stream through an identifier ID 804 between the data transport module and the HTTP daemon. In addition, the HTTP request-response object 802 may transmit either a HTTP request or a HTTP response. More particularly, a HTTP_OP field 806 indicates whether the object is transmitting request or response data. In addition, the HTTP_OP field 806 may also indicate that an error message is being transmitted. A FIRST field 808 indicates whether this is the first block of data in a set of request or response data. A MORE field 810 indicates whether more request or response data is to follow for the associated HTTP request or response, respectively.

In accordance with one embodiment, the HTTP request-response object 302 also transmits information that can modify the flow of data between the data transport module and the HTTP daemon as well as the flow of data to the client. A PREEMPT field 812 may be set to preempt data flow from the data transport module to the HTTP daemon as well as to preempt data flow from the HTTP daemon to the data transport module. In addition, data transport information 814 may specify HTTP request data or HTTP response data that is to be transmitted to the client in accordance with the HTTP_OP field 806. More particularly, the data transport information 814 may include HTTP request/response DATA 816 (e.g., byte stream), a DIRECT field 818 that identifies data (e.g., file, shared memory segment, previously cached object) that is directly accessible by the data transport module. Thus, this data need not be transported by the object from the HTTP daemon to the data transport module. In addition, the DIRECT TYPE 820 (e.g., file, shared memory segment, previously cached object) of the directly accessible data 818 may be specified in order to enable the data to be subsequently accessed by the data transport module. Finally, a TRAILER 822 field may be used to include encapsulation information such as whether the response needs to be encapsulated prior to being transmitted to the client or indicate a method of encapsulation.

Caching attributes 824 (i.e., cache control indicators) may be provided in the HTTP request-response object 802 by the HTTP daemon in order to manage information that is stored in the HTTP cache as well as to control transmission of the response data. As shown, the set of exemplary caching attributes 824 includes an advisory state 826, a nocache state 828, a CTAG 830, and an advise state 832. The advisory state 826 indicates whether the cache manager 305 must communicate with the HTTP daemon 310 in order to determine whether response data can be transmitted to a client that has sent a HTTP request. In addition, the nocache state 828 indicates whether the HTTP response and associated data are to be stored in the in-kernel HTTP cache 307. The CTAG 830 is a unique identifier associated with a HTTP response that enables the response to be associated with multiple HTTP requests in the HTTP cache. The advise state 832 may be provided by the HTTP daemon 310 in response to a HTTP request from the cache manager 305 as well as independently without receiving a request from the cache manager 305. The advise state 816 indicates an action to be taken with the response data and may specify a variety of actions, including but not limited to, modifying, storing, or flushing data from the in-kernel HTTP cache as well as controlling the response data that is transmitted to a client that has submitted a HTTP request. Moreover, although the advise state 832 and the advisory state 826 are shown as separate states, they may be implemented as a single field. In addition, the HTTP daemon 310 may optionally provide response data in data field 816 in the HTTP request-response object.

In accordance with one embodiment, the NCA and the HTTP daemon exchange information through sending a HTTP request-response object in which the information is provided. Although the data transport module and HTTP daemon transmit the same type of object (e.g., HTTP request-response object), the data transport module and the HTTP daemon may transmit the information in a variety of formats. Accordingly, the HTTP request-response object is merely illustrative and other mechanisms for storing and transmitting data between the data transport module and the HTTP daemon are contemplated.

Through the use of the present invention, the transmission of data that is provided in a HTTP request is accelerated. This is accomplished, in part, through enabling efficient use of resources such as the CPU (e.g., threads) through providing HTTP request data for multiple HTTP requests in a single stream. As described above, the HTTP request data for each HTTP request is identified through a unique connection identifier.

Figure 9:
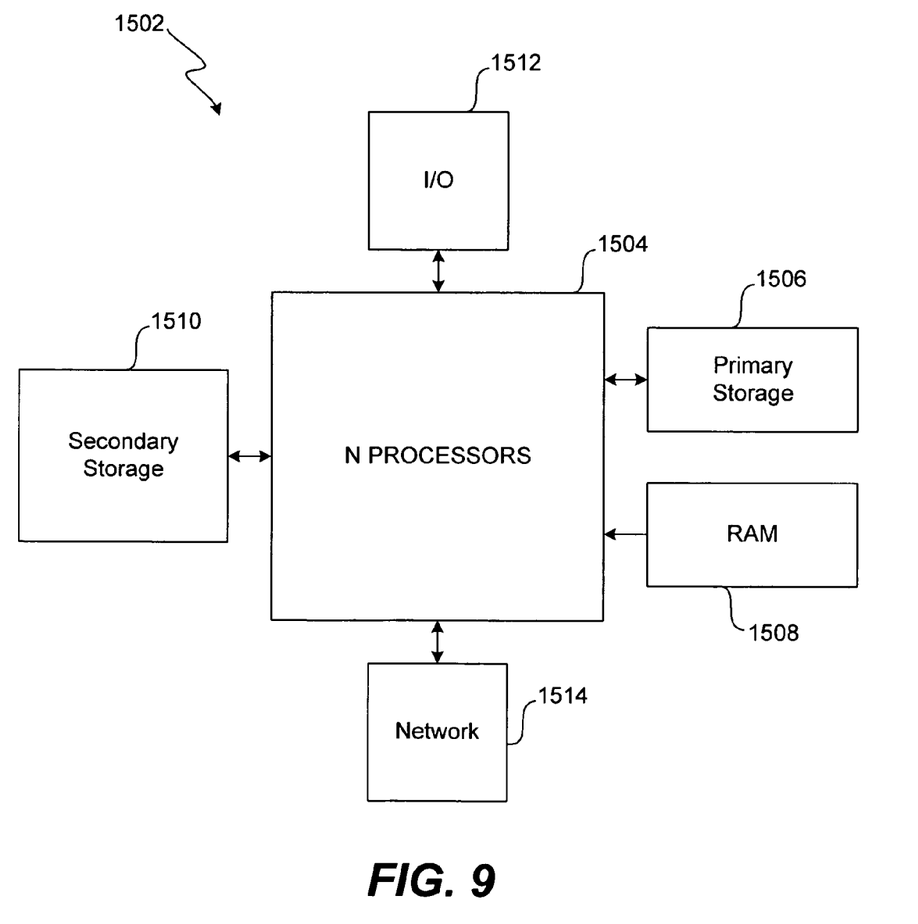
FIG. 9 is a block diagram illustrating a typical, general-purpose computer system suitable for implementing the present invention.

The present invention may be implemented on any suitable computer system. FIG. 9 illustrates a typical, general-purpose computer system 1502 suitable for implementing the present invention. The computer system may take any suitable form.

Computer system 1502 or, more specifically, CPUs 1504, may be arranged to support a virtual machine, as will be appreciated by those skilled in the art. The computer system 1502 includes any number of processors 1504 (also referred to as central processing units, or CPUs) that may be coupled to memory devices including primary storage device 1506 (typically a read only memory, or ROM) and primary storage device 1508 (typically a random access memory, or RAM). As is well known in the art, ROM acts to transfer data and instructions uni-directionally to the CPUs 1504, while RAM is used typically to transfer data and instructions in a bi-directional manner. Both the primary storage devices 1506, 1508 may include any suitable computer-readable media. The CPUs 1504 may generally include any number of processors.

A secondary storage medium 1510, which is typically a mass memory device, may also be coupled bi-directionally to CPUs 1504 and provides additional data storage capacity. The mass memory device 1510 is a computer-readable medium that may be used to store programs including computer code, data, and the like. Typically, the mass memory device 1510 is a storage medium such as a hard disk which is generally slower than primary storage devices 1506, 1508.

The CPUs 1504 may also be coupled to one or more input/output devices 1512 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, the CPUs 1504 optionally may be coupled to a computer or telecommunications network, e.g., an internet network or an intranet network, using a network connection as shown generally at 1514. With such a network connection, it is contemplated that the CPUs 1504 might receive information from the network, or might output information to the network in the course of performing the above-described method steps. Such information, which is often represented as a sequence of instructions to be executed using the CPUs 1504, may be received from and output to the network, for example, in the form of a computer data signal embodied in a carrier wave.

In accordance with the present invention, the web server and associated software may run on the CPUs 1504. Similarly, web pages and associated information may be stored in data storage devices 1506, 1508, and 1510.

Although illustrative embodiments and applications of this invention are shown and described herein, many variations and modifications are possible which remain within the concept, scope, and spirit of the invention, and these variations would become clear to those of ordinary skill in the art after perusal of this application. For instance, the present invention is described as being implemented in a web server. However, the present invention may be used in other contexts. Moreover, the above described process blocks are illustrative only. Therefore, the implementation of the cache manager, the data transport module, the NCA file system and HTTP daemon may be performed using alternate process blocks as well as alternate data structures. Accordingly, the present embodiments are to be considered as illustrative and not restrictive, and the invention is not to be limited to the details given herein, but may be modified within the scope and equivalents of the appended claims.

What is claimed is:

1. In a web server, a method of sending a HTTP request to a HTTP daemon, comprising:
   receiving a HTTP request including HTTP request data from a HTTP client;
   associating a connection identifier with the HTTP request;
   repeating the receiving and associating steps for HTTP requests from a plurality of other HTTP clients;
   sending the connection identifier and the associated HTTP request data for the HTTP requests from the HTTP clients in a first stream from a network cache accelerator of the web server to a file system of the web server, the network cache accelerator being adapted for communicating with the HTTP clients; and
   storing the HTTP requests with the associated connection identifiers by the file system, the file system being adapted for sending each of the HTTP requests to the HTTP daemon and receiving HTTP responses from the HTTP daemon for each of the HTTP requests.

2. The method as recited in claim 1, further comprising:
   creating the first stream;
   wherein sending the connection identifier and the associated HTTP request data for the one or more HTTP requests from the HTTP clients comprises sending the connection identifier and the associated HTTP request data for the one or more HTTP requests in the first stream.

3. The method as recited in claim 2, further comprising:
   creating a second stream from the file system of the web server to the network cache accelerator of the web server;
   obtaining HTTP response data associated with one of the HTTP requests by the file system from the HTTP daemon; and
   sending the HTTP response data and the connection identifier in the second stream from the file system to the network cache accelerator.

4. The method as recited in claim 3, wherein creating the second stream is performed in parallel with reading of an HTTP request and preparation of a corresponding HTTP response by the HTTP daemon.

5. The method as recited in claim 3, wherein creating the second stream is further performed asynchronously with the reading of the HTTP request and the preparation of the corresponding HTTP response by the HTTP daemon.

6. The method as recited in claim 1, further comprising:
instantiating an object;
providing the connection identifier and the associated HTTP request data for the HTTP requests in the object; and
wherein sending the connection identifier and the associated HTTP request data for the one or more HTTP requests comprises sending the object.

7. The method as recited in claim 1, further comprising:
receiving a read request at the file system from the HTTP daemon;
sending HTTP request data from the file system to the HTTP daemon in response to the read request.

8. The method as recited in claim 7, wherein sending HTTP request data from the file system to the HTTP daemon in response to the read request comprises:
sending a file descriptor including the HTTP request data, the file descriptor having a private attachment including the connection identifier associated with the HTTP request data.

9. The method as recited in claim 7, further comprising:
receiving HTTP response data associated with the HTTP request data at the file system from the HTTP daemon.

10. The method as recited in claim 9, wherein receiving HTTP response data associated with the HTTP request data at the file system from the HTTP daemon comprises:
receiving a file descriptor including the HTTP response data, the file descriptor having a private attachment including the connection identifier associated with the HTTP request data.

11. The method as recited in claim 10, further comprising:
obtaining the connection identifier from the private attachment; and
storing the HTTP response data such that the HTTP response data is associated with one of the HTTP requests and the obtained connection identifier.

12. The method as recited in claim 9, further comprising:
storing the HTTP response data such that the HTTP response data is associated with one of the HTTP requests and the associated connection identifier.

13. The method as recited in claim 9, further comprising:
sending a write command including the connection identifier and the HTTP response data to a data transport module capable of transmitting the HTTP response data to a client.

14. The method as recited in claim 9, further comprising:
creating a second stream from the file system to the network cache accelerator; and
sending the HTTP response data and the connection identifier in the second stream from the file system to the network cache accelerator.

15. The method as recited in claim 14, further comprising:
instantiating an object;
providing the HTTP response data and the connection identifier in the object; and
wherein sending the HTTP response data and the connection identifier comprises sending the object to a data transport module of the network cache accelerator for transmission to a client.

16. In a web server, a method of processing a HTTP response including HTTP response data received from a HTTP daemon, comprising:
receiving HTTP response data from the HTTP daemon;
obtaining a connection identifier associated with the HTTP response data;
creating a stream from a file system of the web server to a network cache accelerator of the web server, the network cache accelerator being adapted for communicating with a plurality of HTTP clients corresponding to a plurality of HTTP requests, the file system being adapted for sending each of the HTTP requests to the HTTP daemon and receiving HTTP responses from the HTTP daemon for each of the HTTP requests; and
sending the HTTP response data and the obtained associated connection identifier corresponding to the plurality of HTTP requests for the plurality of HTTP clients in the stream from the file system of the web server to the network cache accelerator of the web server for transmission to a client.

17. A computer-readable medium storing thereon computer-readable instructions for sending a plurality of HTTP request to a HTTP daemon in a web server, comprising:
instructions for receiving a HTTP request including HTTP request data from a HTTP client;
instructions for associating a connection identifier with the HTTP request;
instructions for repeating the receiving and associating steps for HTTP requests from a plurality of other HTTP clients;
instructions for sending the connection identifier and the associated HTTP request data for the HTTP requests from the HTTP clients in a first stream from a network cache accelerator of the web server to a file system of the web server, the network cache accelerator being adapted for communicating with the HTTP clients; and
instructions for storing the HTTP requests with the associated connection identifiers by the file system, the file system being adapted for sending each of the HTTP requests to the HTTP daemon and receiving HTTP responses from the HTTP daemon for each of the HTTP requests.

18. A web server adapted for sending a HTTP request to a HTTP daemon, comprising:
a processor; and
a memory, at least one of the processor and the memory being adapted for:
receiving a HTTP request including HTTP request data from a HTTP client;
associating a connection identifier with the HTTP request;
repeating the receiving and associating steps for HTTP requests from a plurality of other HTTP clients;
sending the connection identifier and the associated HTTP request data for the HTTP requests from the HTTP clients in a first stream from a network cache accelerator of the web server to a file system of the web server, the network cache accelerator being adapted for communicating with the HTTP clients; and
storing the HTTP requests with the associated connection identifiers by the file system, the file system being adapted for sending each of the HTTP requests to the HTTP daemon and receiving HTTP responses from the HTTP daemon for each of the requests.

19. A computer-readable medium storing thereon computer-readable instructions for processing a HTTP response including HTTP response data received from a HTTP daemon in a web server, comprising:

instructions for receiving HTTP response data from the HTTP daemon;

instructions for obtaining a connection identifier associated with the HTTP response data;

instructions for creating a steam from a file system of the web server to a network cache accelerator of the web server, the network cache accelerator being adapted for communicating with a plurality of HTTP clients corresponding to a plurality of HTTP requests, the file system being adapted for sending each of the HTTP requests to the HTTP daemon and receiving HTTP responses from the HTTP daemon for each of the HTTP requests; and instructions for sending the HTTP response data and the obtained associated connection identifier corresponding to the plurality of HTTP requests in the stream from the file system of the web server to the network cache accelerator of the web server for transmission to a client.

20. A web server adapted for processing a HTTP response including HTTP response data received from a HTTP daemon, comprising:

a processor; and a memory, at least one of the processor and the memory being adapted for:

receiving HTTP response data from the HTTP daemon;

obtaining a connection identifier associated with the HTTP response data;

creating a stream from a file system of the web server to a network cache accelerator of the web server, the network cache accelerator being adapted for communicating with a plurality of HTTP clients corresponding to a plurality of HTTP requests, the file system being adapted for sending each of the HTTP requests to the HTTP daemon and receiving HTTP responses from the HTTP daemon for each of the HTTP requests; and sending the HTTP response data and the obtained associated connection identifier corresponding to the plurality of HTTP requests in the stream from the file system of the web server to the network cache accelerator of the web server for transmission to a client.

* * * * *

UNITED STATES PATENT AND TRADEMARK OFFICE
CERTIFICATE OF CORRECTION

PATENT NO. : 7,028,091 B1  Page 1 of 1
APPLICATION NO. : 09/654103
DATED : April 11, 2006
INVENTOR(S) : Tripathi et al.

It is certified that error appears in the above-identified patent and that said Letters Patent is hereby corrected as shown below:

In line 21 of claim 18 (column 12, line 63) change "the requests" to --the HTTP requests--.

In line 9 of claim 19 (column 13, line 5) change "a steam" to --a stream--.

Signed and Sealed this

Tenth Day of October, 2006

JON W. DUDAS
*Director of the United States Patent and Trademark Office*